(12) United States Patent
Miyazawa

(10) Patent No.: US 7,170,689 B2
(45) Date of Patent: Jan. 30, 2007

(54) FRONT CONVERTER LENS

(75) Inventor: Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/129,943

(22) Filed: May 16, 2005

(65) Prior Publication Data

US 2005/0259328 A1    Nov. 24, 2005

(30) Foreign Application Priority Data

May 21, 2004   (JP)   ............... 2004-151980

(51) Int. Cl.
*G02B 15/02* (2006.01)
(52) U.S. Cl. .............. 359/672; 359/673; 359/674; 359/675; 359/795
(58) Field of Classification Search ........ 359/672–675, 359/795
See application file for complete search history.

(56) References Cited

U.S. PATENT DOCUMENTS

2005/0018293 A1* 1/2005 Suzuki ................. 359/558

FOREIGN PATENT DOCUMENTS

| JP | 55-32046 A | 3/1980 |
| JP | 4-191717 A | 7/1992 |
| JP | 6-289289 A | 10/1994 |

* cited by examiner

*Primary Examiner*—Evelyn A. Lester
(74) *Attorney, Agent, or Firm*—Canon U.S.A. Inc I.P. Div

(57) ABSTRACT

A converter lens includes a front unit and a rear unit disposed on an image side with respect to the front unit. The front unit has positive optical power and includes two positive lens elements. The two positive lens elements are spaced apart. The rear unit has negative optical power and includes a positive lens element and a negative lens element.

9 Claims, 5 Drawing Sheets

FRONT CONVERTER LENS

BACKGROUND OF THE INVENTION

1. Field of the Invention

The present invention relates to a converter lens that is attached in front of (on the object side of) an imaging lens (a main lens system) of a camera such as a digital still camera, a camcorder, or a silver salt (film) camera so as to change the focal length of the entire lens system.

2. Description of the Related Art

Japanese Patent Laid-Open No. 55-32046 discloses a front teleconverter lens (teleconverter) that is attached in front of an imaging lens so as to increase the focal length of the entire system.

Most teleconverters include a front unit having positive optical power and a rear unit having negative optical power. The distance between the principal points of the two lens units is the sum of focal lengths of the two lens units. The two lens units together constitute an afocal system. Optical power is the reciprocal of the focal length of a lens unit. In the case of a lens unit composed of a refractive optical element such as a lens, optical power is equal to refractive power. The simplest lens system may be composed of a single positive lens and a single negative lens. However, in the case of only two lenses, aberration correction is difficult, and high optical performance cannot be obtained.

Japanese Patent Laid-Open No. 4-191717 and Japanese Patent Laid-Open No. 6-289289 disclose teleconverters including three or more lenses.

In the case of a high afocal magnification, when a front unit is composed of a single lens, correction of aberrations is difficult. In order to solve this problem, the teleconverter disclosed in Japanese Patent Laid-Open No. 4-191717 includes a front unit composed of two positive meniscus lenses, each lens having weak optical power. However, the rear unit is composed of a single negative lens, and therefore correction of chromatic aberration is insufficient.

The teleconverter disclosed in Japanese Patent Laid-Open No. 6-289289 includes a front unit composed of a single positive lens formed of low-dispersion glass so as to prevent deterioration of chromatic aberration. However, the afocal magnification is low (less than 1.3 times).

The lenses constituting a front unit have a large diameter. Therefore, if a front unit is composed of too many lenses, the weight and the cost increase significantly.

SUMMARY OF THE INVENTION

The present invention is directed to a converter lens that has a high afocal magnification, is composed of a relatively small number of lenses, and is low in cost and light in weight.

In one aspect of the present invention, a converter lens includes a front unit and a rear unit disposed on an image side with respect to the front unit. The front unit has positive optical power and includes two positive lens elements. The two positive lens elements are spaced apart. The rear unit has negative optical power and includes a positive lens element and a negative lens element.

Further features and advantages of the present invention will become apparent from the following description of exemplary embodiments (with reference to the attached drawings).

DESCRIPTION OF THE EMBODIMENTS

Embodiments of the present invention will now be described with reference to the drawings. The converter lenses of these embodiments are teleconverters that are attached in front of an imaging lens of a camera so as to increase the focal length of the entire lens system.

Figure 1:
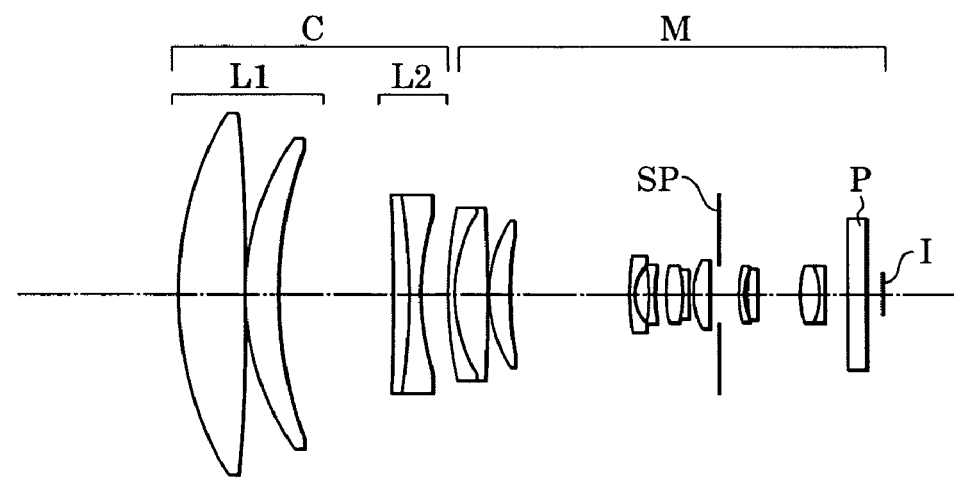
FIG. 1 is a lens sectional view of a teleconverter and a main lens system of embodiment 1.
Figure 3:
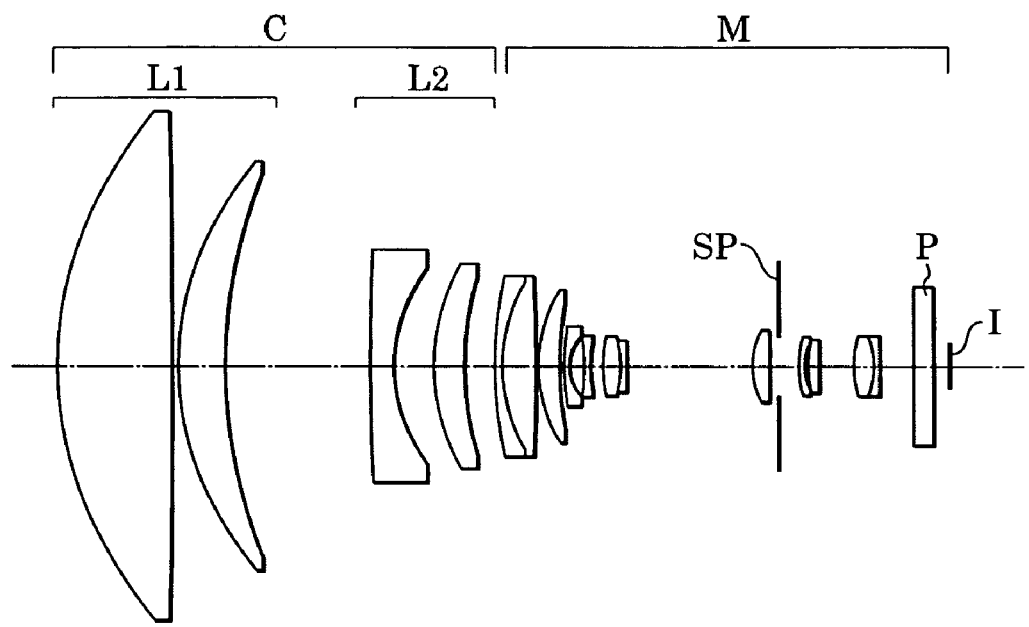
FIG. 3 is a lens sectional view of a teleconverter and a main lens system of embodiment 2.
Figure 5:
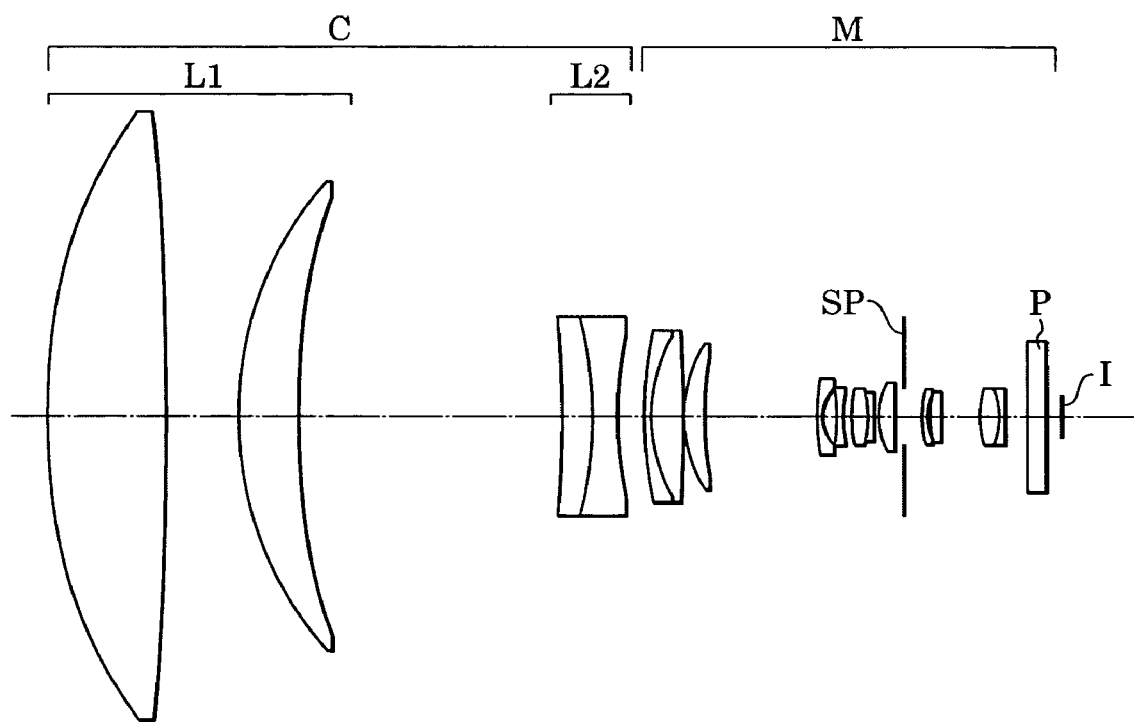
FIG. 5 is a lens sectional view of a teleconverter and a main lens system of embodiment 3.

FIGS. 1, 3, and 5 are lens sectional views in the cases where teleconverters of numerical embodiments 1, 2, and 3, respectively, are attached on the object side of (in front of) an imaging lens (main lens system).

Figure 2:
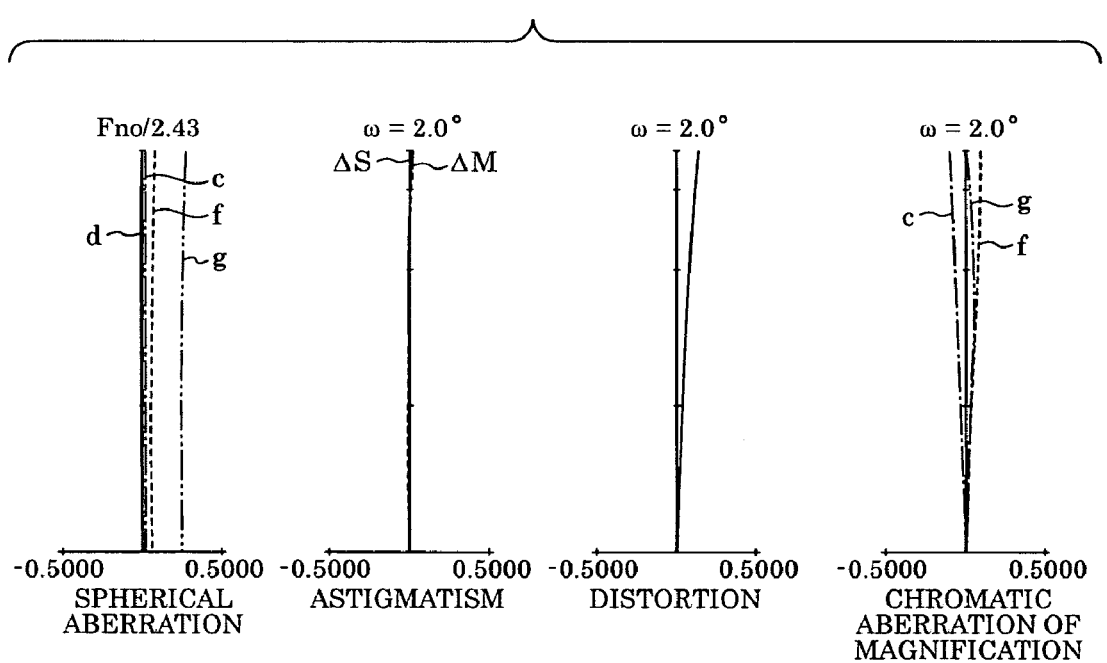
FIG. 2 is an aberration diagram of a system to which the teleconverter of embodiment 1 is attached.
Figure 4:
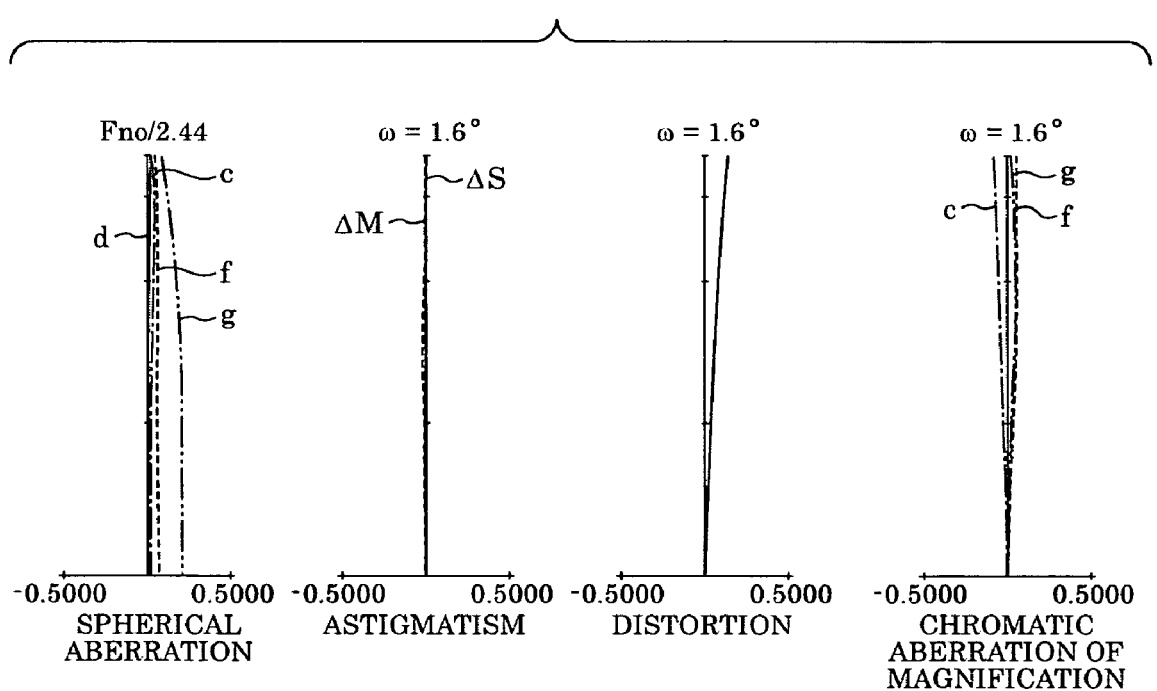
FIG. 4 is an aberration diagram of a system to which the teleconverter of embodiment 2 is attached.
Figure 6:
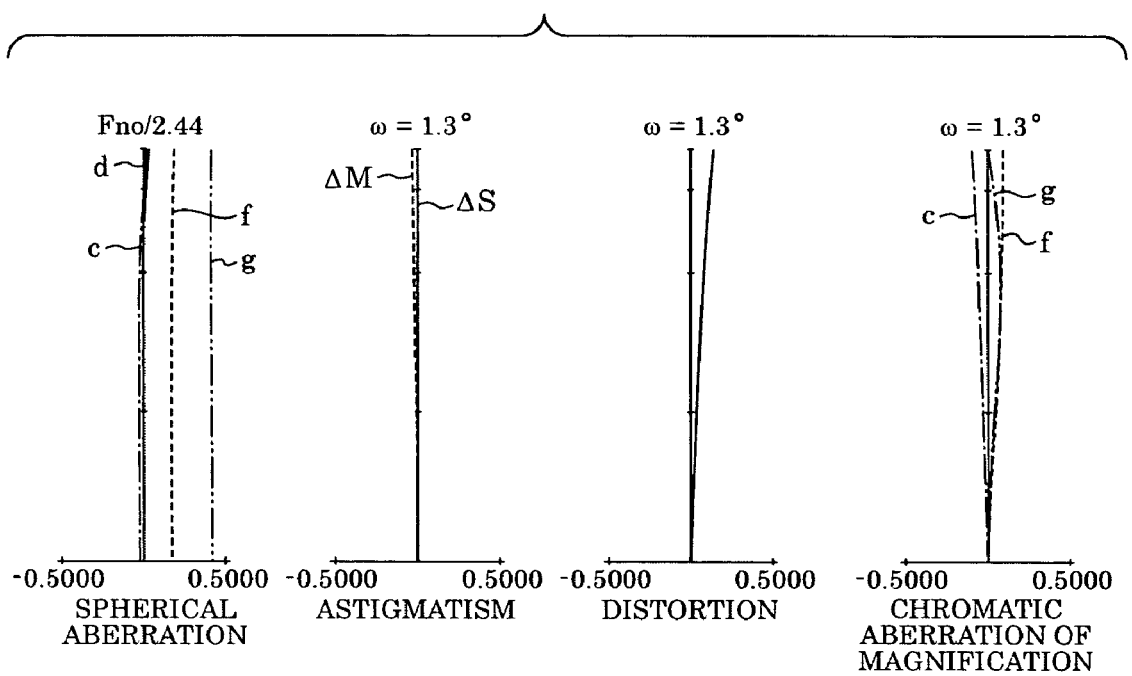
FIG. 6 is an aberration diagram of a system to which the teleconverter of embodiment 3 is attached.
Figure 7:
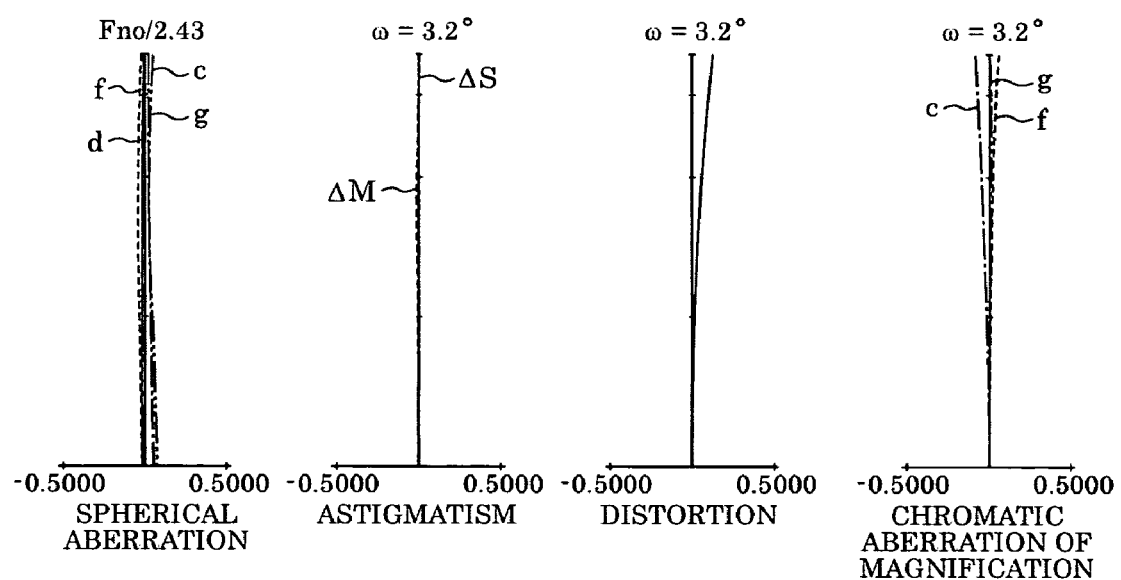
FIG. 7 is an aberration diagram only of a main lens system.

FIGS. 2, 4, and 6 are aberration diagrams in the cases where teleconverters of numerical embodiments 1, 2, and 3, respectively, are attached to a main lens system. In these numerical embodiments, a common lens system is used. FIG. 7 is an aberration diagram in the case of a main lens system alone.

In each lens sectional view, the left side is the object side (the front), and the right side is the image side (the rear). Reference character C denotes a teleconverter, and reference character M denotes an imaging lens. The teleconverter C includes a front unit L1 having positive optical power and disposed on the object side, and a rear unit L2 having negative optical power and disposed on the image side. In the imaging lens M, reference character SP denotes an aperture stop; reference character P denotes a glass block that is provided for design reasons and corresponds to a parallel plate such as an optical low pass filter, an infrared cut-off filter, or a cover glass in the optical path; and reference character I denotes an image plane where the light-sensitive surface of a solid-state image sensor (photoelectric transducer) such as a CCD sensor or a CMOS sensor is located.

In each aberration diagram, reference characters c, d, f, and g denote the c line, the d line, the f line, and the g line respectively; and reference characters ΔM and ΔS denote the meridional image surface and the sagittal image surface respectively.

In the teleconverters C of these embodiments, the distance between the principal points of the front unit L1 and the rear unit L2 is substantially the sum of focal lengths of the front unit L1 and the rear unit L2. The two lens units together constitute a substantially afocal system.

By disposing two positive lens elements in the front unit L1, the spherical aberration and the astigmatism are mainly corrected. By disposing a positive lens element and a negative lens element in the rear unit L2, the chromatic aberration occurring in the front unit L1 is effectively eliminated.

In the teleconverters C of these embodiments, in order to perform better aberration correction, the surface on the image side of the positive lens element closest to the object is convex. If the surface on the image side of the positive lens element closest to the object is concave, in order to keep the desired optical power, it is necessary to reduce the radius of curvature of the surface on the object side of the positive lens element. If the radius of curvature is reduced, at the telephoto end where the angle of view is small, the angle between an oblique incident ray and the surface on the object side of the positive lens element closest to the object becomes steep. Consequently, the chromatic aberration of magnification (the lateral chromatic aberration) becomes large, and it becomes difficult for the rear unit L2 to correct this aberration. Therefore, in these embodiments, the surface on the image side of the positive lens element closest to the object is convex and the degree of the chromatic aberration of magnification is reduced so that the rear unit L2 can correct the chromatic aberration of magnification.

The positive lens element closest to the object has a large clear aperture, and the degree of aberrations occurring there is large. Therefore, in the positive lens element closest to the object, the radius of curvature is large (the optical power is small) to reduce aberrations. Therefore, in these embodiments, the teleconverters satisfy the following condition:

$$|RI| > |RO| \quad (1)$$

where RI is the radius of curvature of the surface on the image side of the positive lens element closest to the object, and RO is the radius of curvature of the surface on the object side of the positive lens element closest to the image in the front unit. In addition, the teleconverters of these embodiments also satisfy the following condition:

$$5 < |RI/RO| \quad (2)$$

If the surface on the object side of the positive lens element closest to the object is convex, it is possible to increase |RI| with the positive optical power maintained.

Moreover, the teleconverters of these embodiments also satisfy the following condition:

$$1.5 < |fP/fN| < 3.0 \quad (3)$$

where fP is the focal length of the front unit L1, and fN is the focal length of the rear unit L2.

Conditional expression (3) limits the afocal magnification of a teleconverter. If |fP/fN| is greater than the upper limit of conditional expression (3), the chromatic aberration occurring in the front unit L1 is too large for the rear unit L2 alone to sufficiently correct, and the image quality deteriorates significantly. If |fP/fN| is less than the lower limit of conditional expression (3), the degree of aberrations occurring in the front unit L1 is small, and therefore the need of the lens configurations of these embodiments is small. The range of conditional expression (3) can also be set to as follows:

$$1.6 < |fP/fN| < 2.6 \quad (3a)$$

Next, numerical data of numerical embodiments 1 to 3 will be shown. In each numerical embodiment, reference character Ri denotes the radius of curvature of the i-th surface from the object side, reference character Di denotes the distance between the i-th surface and the (i+1)-th surface, reference characters Ni and vi denote the refractive index and the Abbe constant, respectively, of the optical element based on the d line. In addition, the numerical data of the main lens system (imaging lens M) will be shown. In the numerical data of the main lens system, the two planes closest to the image constitute the above-described glass block GB provided for design reasons. Reference character f denotes the focal length, reference character Fno denotes the F-number, and reference character ω denotes the half angle of view.

An aspherical shape is expressed by the following formula:

$$X = \frac{(1/R)H^2}{1 + \sqrt{1-(1+K)(H/R)^2}} + BH^4 + CH^6 + DH^8 + EH^{10} + FH^{12} \quad \text{Formula 1}$$

where X axis is in the direction of the optical axis, H axis is in the direction perpendicular to the optical axis, the traveling direction of light is positive, R is the paraxial radius of curvature, K is the conic constant, and B, C, D, E, and F are aspherical coefficients. Incidentally, "e±Z" means "x10$^{±z}$".

Table 1 shows the relation between the above conditional expressions and numerical embodiments.

Numerical Embodiment 1
1.64 times
R1=50.964 D1=9.00 N1=1.487490 v1=70.2
R2=−224.857 D2=0.30
R3=37.531 D3=4.00 N2=1.487490 v2=70.2
R4=54.080 D4=15.00
R5=−243.690 D5=2.00 N3=1.846660 v3=23.9
R6=−100.901 D6=1.50 N4=1.834000 v4=37.2
R7=36.891 D7=3.80

Numerical Embodiment 2
1.98 times
R1=47.743 D1=14.64 N1=1.496999 v1=81.5
R2=−6539.459 D2=0.98
R3=39.131 D3=5.62 N2=1.496999 v2=81.5
R4=65.714 D4=18.33
R5=829.088 D5=3.01 N3=2.003300 v3=28.3
R6=21.205 D6=4.92
R7=26.029 D7=4.01 N4=1.922860 v4=18.9
R8=40.003 D8=3.80

Numerical Embodiment 3
2.51 times
R1=86.372 D1=16.47 N1=1.433870 v1=95.1
R2=−361.663 D2=10.00
R3=52.557 D3=8.28 N2=1.433870 v2=95.1
R4=113.013 D4=36.10
R5=−181.942 D5=4.19 N3=1.922860 v3=18.9
R6=−57.843 D6=3.48 N4=2.003300 v4=28.3
R7=52.764 D7=3.80

Main Lens System
f=46.728
R1=45.439 D1=1.05 N1=1.846660 v1=23.9
R2=21.972 D2 =4.42 N2=1.603112 v2=60.6
R3=−175.910 D3=0.17
R4=18.527 D4=2.68 N3=1.772499 v3=49.6
R5=49.994 D5=15.72
R6=40.310 D6=0.60 N4=1.846660 v4=23.9
R7=6.119 D7=2.00
R8=−15.571 D8=0.60 N5=1.772499 v5=49.6
R9=15.571 D9=1.70
R10=14.649 D10=2.27 N6=1.846660 v6=23.9
R11=−11.573 D11=0.07
R12=−10.432 D12=0.60 N7=1.772499 v7=49.6
R13=49.276 D13=0.65
R14=9.009 D14=2.13 N 8=1.693500 v8=53.2
R15=146.263 D15=1.25
R16=∞(diaphragm) D16=2.62

R17=17.860 D17=0.60 N9=1.846660 v9=23.9
R18=7.660 D18=0.45
R19=14.925 D19=1.34 N10=1.603112 v10=60.6
R20=−247.566 D20=5.54
R21=11.668 D21=2.74 N11=1.712995 v11=53.9
R22=−9.023 D22=0.50 N12=1.846660 v12=23.9
R23=46.321 D23=3.32
R24=∞ D24=2.40 N13=1.516330 v13=64.1
R25=∞
R14(aspherical surface)
K=−1.86050e-01
B=−1.18491e-04    C=−6.43582e-07    D=6.57163e-11
E=−1.34365e-12

TABLE 1

|  | Conditional Expression (2) | Conditional Expression (3) |
|---|---|---|
| Numerical Embodiment 1 | 5.99 | 1.64 |
| Numerical Embodiment 2 | 167.12 | 1.98 |
| Numerical Embodiment 3 | 6.88 | 2.51 |

Next, an embodiment of an imaging apparatus will be described with reference to FIG. 8. The converter lens of the present invention can be attached in front of an imaging optical system of the imaging apparatus.

Figure 8:
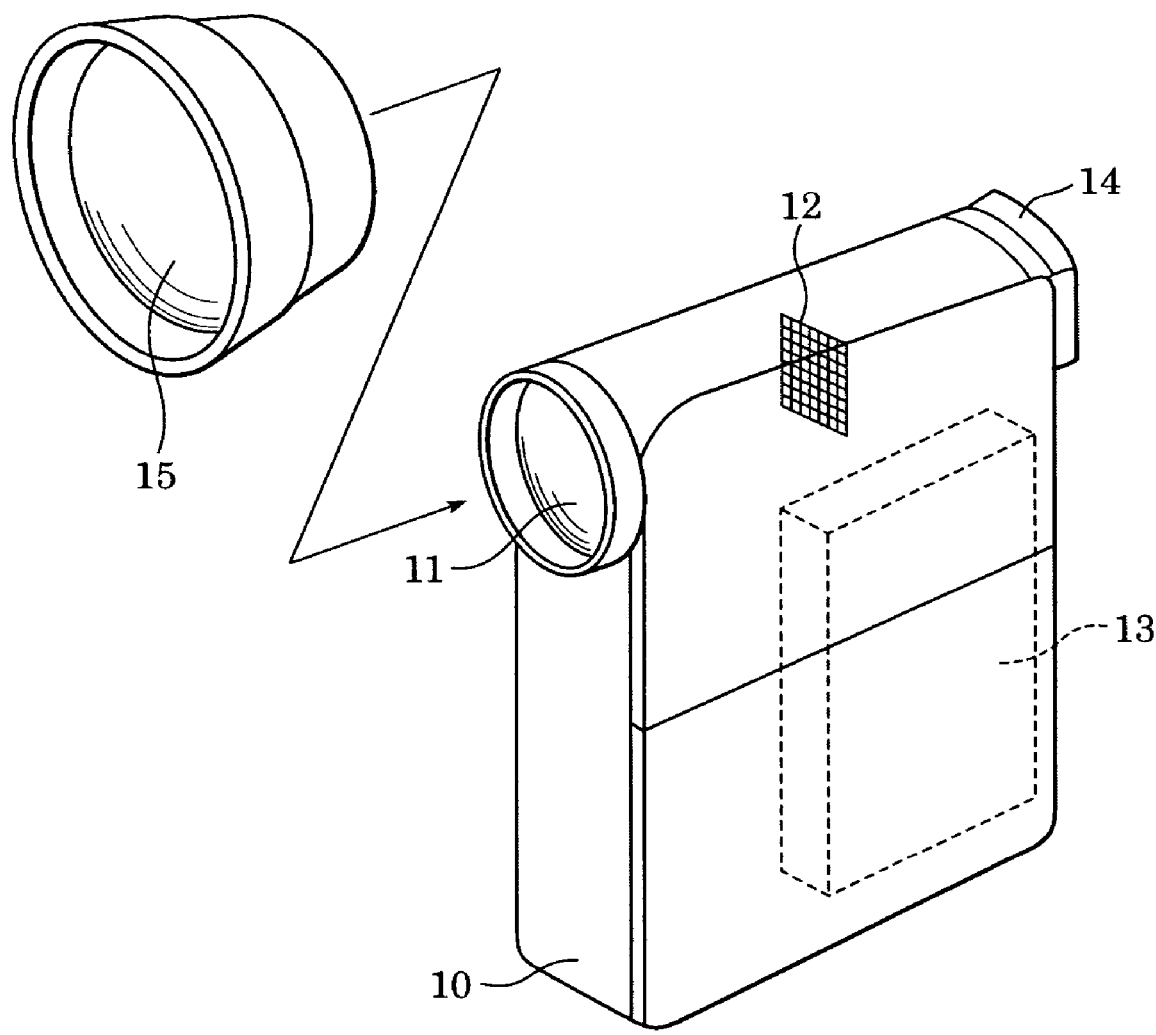
FIG. 8 is a schematic view of a camcorder.

In FIG. 8, reference numeral 10 denotes a main body of a camcorder; reference numeral 11 denotes an imaging optical system; reference numeral 12 denotes a solid-state image sensor (photoelectric transducer), such as a CCD sensor or a CMOS sensor, receiving a subject image formed by the imaging optical system 11; reference numeral 13 denotes a memory for recording information corresponding to the subject image photoelectrically transduced by the image sensor 12; reference numeral 14 denotes a viewfinder for observing the subject image displayed on a display element (not shown); and reference numeral 15 denotes a converter lens of the present invention. The display element is composed of a liquid crystal panel and so on. The subject image formed on the image sensor 12 is displayed on the display element.

Detachably attaching the converter lens of the present invention in front of an imaging optical system of an imaging apparatus such as a camcorder makes it possible to change the focal length of the entire optical system.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-151980 filed May 21, 2004, which is hereby incorporated by reference herein.

What is claimed is:

1. A converter lens comprising:
   a front unit having positive optical power, wherein the front unit consists of a plurality of positive lens elements, the plurality of positive lens elements of the front unit being spaced apart; and
   a rear unit disposed on an image side with respect to the front unit and having negative optical power, the rear unit including a positive lens element and a negative lens element.

2. The converter lens according to claim 1, wherein a surface on the image side of the positive lens element closest to the object is convex.

3. The converter lens according to claim 1, wherein a radius of curvature of a surface on the image side of the positive lens element closest to the object (RI), and a radius of curvature of a surface on an object side of the positive lens element closest to the image in the front unit (RO) satisfy the following condition:

$|RI|>|RO|$.

4. The converter lens according to claim 1, wherein a radius of curvature of a surface on the image side of the positive lens element closest to the object (RI), and a radius of curvature of a surface on an object side of the positive lens element closest to the image in the front unit (RO) satisfy the following condition:

$5<|RI/RO|$.

5. The converter lens according to claim 1, wherein a surface on the object side of the positive lens element closest to the object is convex.

6. The converter lens according to claim 1, wherein a focal length of the front unit (fP), and a focal length of the rear unit (fN) satisfy the following condition:

$1.5 <|fP/fN|<3.0$.

7. A converter lens comprising:
   a front unit having positive optical power, wherein the front unit includes a plurality of lens elements including two positive lens elements, the plurality of lens elements of the front unit being spaced apart; and
   a rear unit disposed on an image side with respect to the front unit and having negative optical power, the rear unit including a positive lens element and a negative lens element,
   wherein a surface on the image side of the positive lens element closest to the object is convex.

8. A converter lens comprising:
   a front unit having positive optical power, wherein the front unit includes a plurality of lens elements including two positive lens elements, the plurality of lens elements of the front unit being spaced apart; and
   a rear unit disposed on an image side with respect to the front unit and having negative optical power, the rear unit including a positive lens element and a negative lens element,
   wherein a radius of curvature of a surface on the image side of the positive lens element closest to the object (RI), and a radius of curvature of a surface on an object side of the positive lens element closest to the image in the front unit (RO) satisfy the following condition:

$5<|RI/RO|$.

9. A converter lens comprising:
   a front unit having positive optical power, wherein the front unit includes a plurality of lens elements including two positive lens elements, the plurality of lens elements of the front unit being spaced apart; and
   a rear unit disposed on an image side with respect to the front unit and having negative optical power, the rear unit including a positive lens element and a negative lens element,
   wherein a focal length of the front unit (fP), and a focal length of the rear unit (fN) satisfy the following condition:

$1.5<|fP/fN|<3.0$.

* * * * *